United States Patent
Mersereau

Patent Number: 5,666,155
Date of Patent: Sep. 9, 1997

[54] EYE CONTACT VIDEO TELEPHONY

[75] Inventor: Keith Owen Mersereau, Northampton, Pa.

[73] Assignee: Lucent Technologies Inc., Murray Hill, N.J.

[21] Appl. No.: 265,366

[22] Filed: Jun. 24, 1994

[51] Int. Cl.[6] .................................................. H04N 7/14
[52] U.S. Cl. ............................. 348/20; 348/14; 359/443
[58] Field of Search ................................ 348/13, 14, 20; 359/459, 454, 447, 448, 443, 601, 629, 625, 741; 345/32; 379/53; H04N 7/14

[56] References Cited

U.S. PATENT DOCUMENTS

| | | | |
|---|---|---|---|
| 4,928,301 | 5/1990 | Smoot | 379/53 |
| 4,965,819 | 10/1990 | Kannes | 379/53 |
| 5,117,285 | 5/1992 | Nelson et al. | 358/85 |
| 5,159,445 | 10/1992 | Gitlin et al. | 358/85 |
| 5,286,338 | 2/1994 | Feldblum et al. | 156/643 |
| 5,317,405 | 5/1994 | Kuriki et al. | 348/20 |
| 5,400,069 | 3/1995 | Braun et al. | 348/20 |

FOREIGN PATENT DOCUMENTS

| | | | |
|---|---|---|---|
| 596558 | 5/1994 | European Pat. Off. | H04N 7/14 |
| 406022308 | 1/1994 | Japan | H04N 7/14 |
| 406105305 | 4/1994 | Japan | H04N 7/14 |

OTHER PUBLICATIONS

"New Eye-Contact Technique for Videophones," H. Arai et al., SID 92 Digest, Society for Information Display, Playa del Ray, California, 1992, pp. 149–152.

E. Hecht and A. Zajac, "Optics," Addison-Wesley Publishing Company, Inc., Reading, Massachusetts et al. 1979, Chapter 10.2, Diffraction, p. 354.

M. Kuriki et al., "An Eye-Contact Technique for Large-Screen Displays Using a Blazed Half-Transparent Mirror (BHM)", SID 93 Digest, Society for Information Display, Playa del Ray, California, 1993, pp. 919–922.

*Primary Examiner*—Curtis Kuntz
*Assistant Examiner*—Stephen W. Palan
*Attorney, Agent, or Firm*—Roderick B. Anderson; Patricia A. Verlangieri

[57] ABSTRACT

An apparatus for creating an illusion of eye contact in a video telephony system includes a video camera and a display screen. The video camera is aligned with the display screen so the viewer's image is transmitted by the video camera with the illusion of eye contact. The display screen has an array of lenses defining part of a first optical path, for transmitting to a video camera a viewer's image. An array of regions interspersed among the array of lenses defines part of a second optical path, for directing to the viewer, displayed images. The array of lenses and the array of regions are each too small to be separately resolvable by the human eye, so that the lenses do not interfere with the perceived quality of the transmitted viewer's image, and the transparent regions do not deteriorate noticeably the video display images projected to the viewer.

25 Claims, 3 Drawing Sheets

5,666,155

EYE CONTACT VIDEO TELEPHONY

TECHNICAL FIELD

This invention relates to video telephony and, more particularly, to video telephony which creates the illusion of eye contact between subscribers.

BACKGROUND OF THE INVENTION

Video telephony refers to "picture telephones" in which bi-directional video and audio links are established between calling and called parties. It also includes teleconferencing, in which digital images, such as text and graphics, may be displayed adjacent video images of the conferees or subscribers. In either system, it is desirable to create an illusion of eye contact between or among the subscribers. That is, it is desirable that when, for example, a called party views the image of the calling party, the called party sees the image of the calling party such that the eyes of the calling party are directed outwardly from the display screen upon which the calling party's image is displayed and appear to look at the called party.

The patent of Gitlin et al., U.S. Pat. No. 5,159,445, issued Oct. 27, 1992, is an example of apparatus for creating the eye contact illusion. The image display is an image projection screen interposed directly between the subscriber and the camera transmitting the image of the subscriber. The screen rapidly switches between a projection mode during which it reflects and projects the image seen by the subscriber, and a transmission mode, during which the screen is transparent, and the image of the subscriber is recorded by the television camera. The subscriber naturally looks at the screen, and thus directly into the camera, when viewing the display. Consequently, the transmitted image of the subscriber shows the subscriber's eyes looking directly outwardly.

The provision of a screen that is alternately reflective and transparent significantly complicates the video telephone system in which it is used and makes it more expensive. It would be desirable to provide a system that gives the illusion of eye contact without significantly increasing the cost or complexity of the system.

The paper, "New Eye-Contact Technique for Videophones," H. Arai et al., *SID 92 Digest*, Society for Information Display, Playa del Ray, Calif., U.S.A, 1992, pp. 149–152, is an example of "passive" systems in which a beam splitter is located between the subscriber and the video display. The beam splitter, e.g., a blazed grating, directs the viewer's image at a video camera as the viewer looks directly at the display through the beam splitter. This has several disadvantages, among which is the fact that the beam splitter screen cannot be used as a projection screen. Projection screens are advantageous because they can be used to project a larger image than that produced, for example, by a cathode ray display. Making and using appropriate beam splitters such as blazed gratings also may present problems. New methods of making microlens arrays allow projection screens to project images with enhanced optical efficiency, and it would be desirable to take advantage of such technology.

SUMMARY OF THE INVENTION

One embodiment of the invention comprises means for projecting onto a flat display screen images that can be seen by a viewer or subscriber of the system. The screen comprises a first array of first discrete regions for directing to the viewer the video display images, and a second array of second regions interspersed among the first regions. The second array comprises means for transmitting the viewer's image to a video camera while simultaneously directing the video display images to the viewer. The video camera is aligned with a position on the screen toward which the viewer looks to observe the video display images, whereby the viewer's image can be transmitted by the video camera to give an illusion of eye contact. A similar system may be included at the locations of one or more other subscribers to the system, who also will have their images transmitted as they look directly into a camera when viewing their respective displays, thereby giving the illusion of eye contact among the various subscribers.

In one embodiment of the invention, the first array comprises an array of microlenses that forms the screen for the projected video display images, and the second array comprises an array of transparent regions in the screen interspersed among the microlenses for transmitting to the video camera the viewer's image. The microlenses and the transparent regions are each too small to be separately resolvable by the human eye so that the microlenses do not interfere with the perceived quality of the transmitted viewer's image, and the transparent regions do not deteriorate noticeably the video display images projected to the viewer. Such structures can be made with precision and at low cost by using recently developed technologies, as will be described below. Various other embodiments, modifications, benefits, advantages and features of the invention will be better understood from a consideration of the following detailed description taken in conjunction with the accompanying drawing.

DETAILED DESCRIPTION

Figure 1:
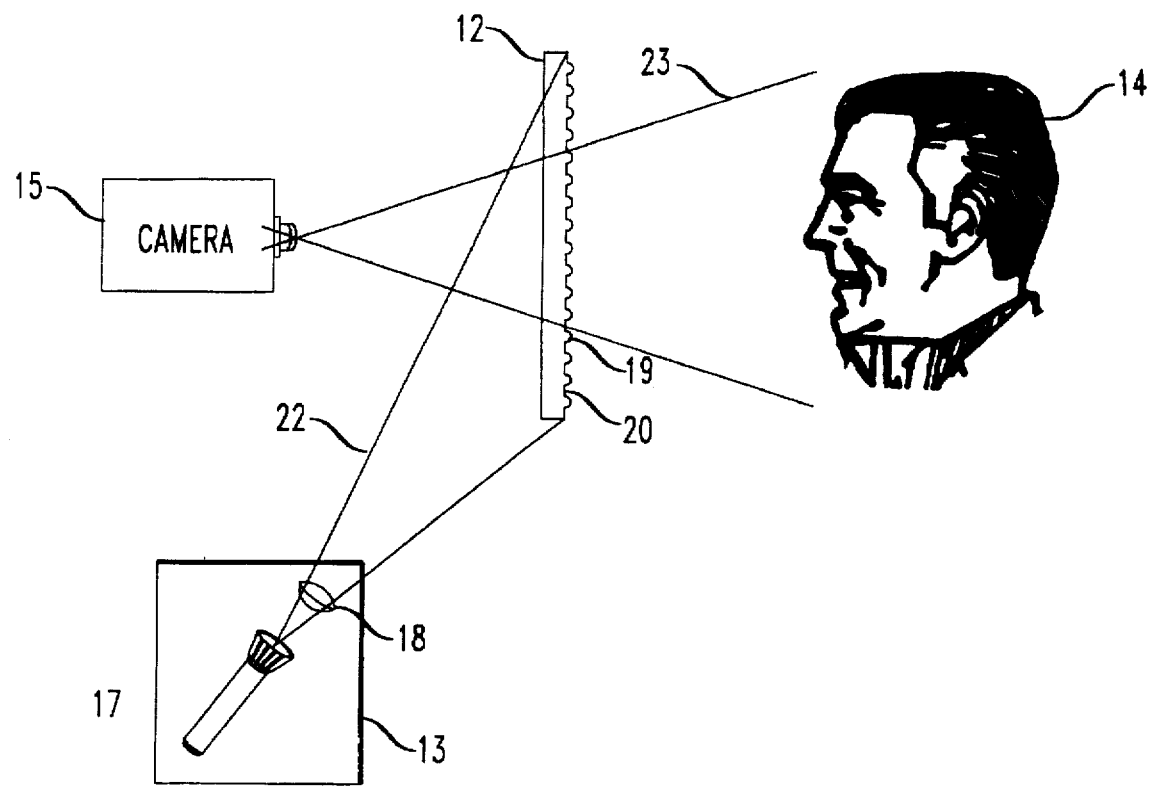
FIG. 1 is a schematic view of part of a video telephony system in accordance with one embodiment of the invention.

The drawings are schematic in nature with dimensions in some cases being distorted to aid in clarity of exposition. Referring to FIG. 1, there is shown schematically a subscriber's station, which is part of a video telephony system, comprising a display screen 12 upon which is projected an image by an image projection system 13. The image displayed on screen 12 is viewed by a viewer 14, and, during such viewing, an image of the viewer is recorded and transmitted by a video camera 15. A similar substation (not shown) of the video telephony system includes at least one other subscriber who views an image of viewer 14, typically while talking to viewer 14.

In accordance with the invention, the video camera 15 is arranged with respect to the display screen 12 such that, when the viewer 14 views the image displayed on screen 12, he also looks directly at camera 15. Consequently, when the image of viewer 14 is displayed at a remote location, the eyes of the viewer are directed outwardly from the displayed image, creating an illusion of eye contact with the subscriber viewing such displayed image. With similar eye-contact video equipment supplied to both subscribers, the image of the subscriber which viewer 14 is observing appears to be looking directly at viewer 14. This can create among one or more subscribers the illusion of face-to-face conversation, and is therefore preferable to conventional picture telephone systems in which the camera is directed toward the viewer 14 at an angle to create the image of a person appearing to look away as his image is displayed and as his voice is transmitted.

The projection system 13 illustratively comprises a cathode ray display tube (CRT) 17 and a projection lens 18. The lens images the image formed on the screen of the CRT 17 onto the display screen 12. Often, three such CRTs and three lenses are used to project respectively the red, green and blue portions of a color image, as known in the art. Such projection of images has the advantage of allowing the display of an image which has a larger area than that defined on the screen of the cathode ray tube 17. Of course, other displays such as liquid crystal displays (LCDs) could be used in place of CRT 17.

Figure 2:
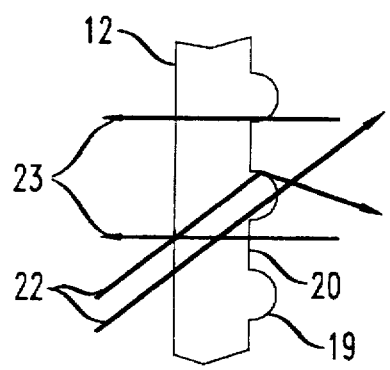
FIG. 2 is a fragmentary view of part of the projection screen of FIG. 1.
Figure 3:
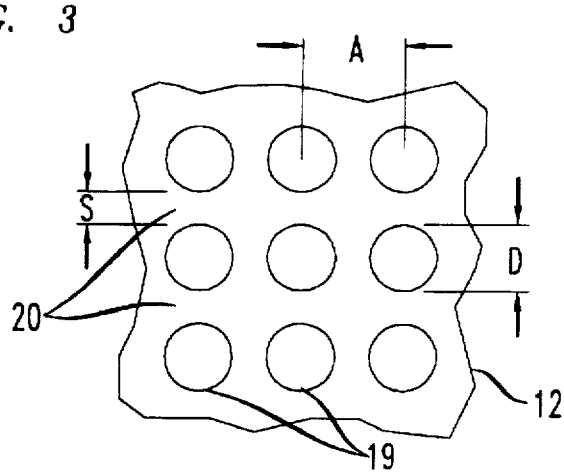
FIG. 3 is a side view of FIG. 2.

In accordance with the invention, the display screen 12 comprises a matrix array of microlenses 19 each separated by a transparent region 20, as shown in more detail in FIGS. 2 and 3. FIG. 2 shows the path of light rays 22 projected from projection system 13 which are refracted by microlenses 19 to enhance the image to be seen by the viewer 14. Rays 23, on the other hand, illustrate light reflected from viewer 14 which is imaged, recorded and transmitted by video camera 15 of FIG. 1. The video camera 15 may comprise a camera tube such as a vidicon, or a solid-state imaging device such as a charge coupled device (CCD), as are known in the art.

It can be shown that microlenses can be used to enhance the optical efficiency of a projection television system. In accordance with the invention, the lenses 19 and the transparent regions 20 are too small to be separately resolvable by the human eye. Consequently, the image projected by the screen is seen as a continuous image, rather than one broken up by the transparent regions 20. Likewise, the image recorded by camera 15 is the continuous image of the viewer 14, rather than an image broken up by individual microlenses 19. Thus, by uniformly interspersing regions defined by microlenses 19 and regions 20, and by making them sufficiently small, one can define two separate optical paths, i.e., paths for the viewer's image and for the displayed image.

Referring to FIG. 3, the diameters D of the microlenses 19 may be fifty microns with the center-to-center spacing A being seventy microns. Consequently, the separation S between adjacent microlenses is twenty microns. None of these dimensions is separately resolvable by the unaided human eye at a distance of more than one foot.

One advantage of the display screen 12 is that it can be made with great precision using the plasma etch technique for making microlenses, as described, for example, in the U.S. patent of Feldblum et al., U.S. Pat. No. 5,286,338, granted Feb. 15, 1994, incorporated by reference herein. The display screen 12 may be glass upon which are formed plastic elements each having the general configuration of lenses 19. The plastic elements (not shown) can be made with precision, for example, by photolithographic masking and etching. These elements are then heated above their melting point so that a meniscus describes an upper curved surface for each element. After cooling, the configurations of plastic elements are replicated in the glass substrate 12 by reactive ion etching; such replications constitute the microlens elements 19 formed in the original glass substrate, as shown in FIGS. 2 and 3. Reactive ion etching is a form of plasma etching, as is known. Not only can small microlenses 19 having diameters of fifty microns, and predetermined spacings of twenty microns, be made with great precision and uniformity by this method, but the Feldblum et al. patent even describes how corrections can be made for lens aberrations. Such a screen can also be used as a master for the production molding of inexpensive plastic screens.

As with known projection television systems, an image formed on CRT 17 is imaged by projection lens 18 onto the display screen 12. If the display screen simply scatters light in the direction of the viewer, the viewer is capable of perceiving the displayed image. However, with precisely formed microlenses, the optical efficiency of the system can be significantly enhanced. Each lens creates an image perceived by the viewer that is slightly displaced from the image plane established by projection lens 18. Nevertheless, projection lens 18 images the displayed image substantially on the screen 12, and for this reason, the system differs from beam splitter apparatus such as that described in the aforementioned Arai et al. paper in which there is not, and cannot be, imaging by a projection lens onto the beam splitter.

Figure 4:
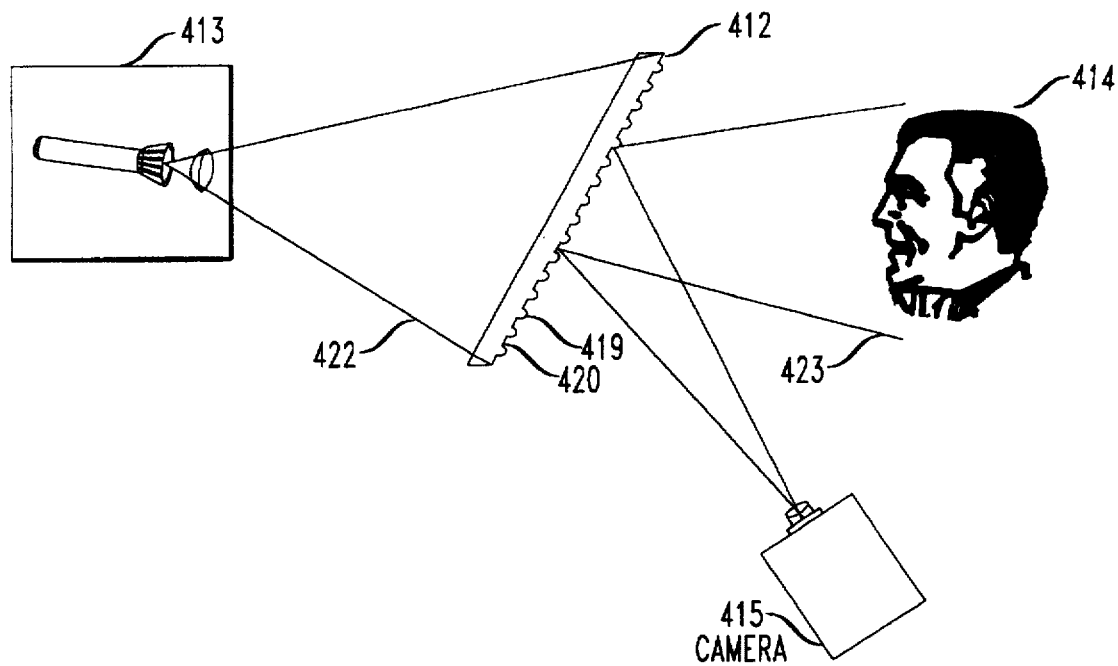
FIG. 4 is a schematic view illustrating another embodiment of the invention.
Figure 5:
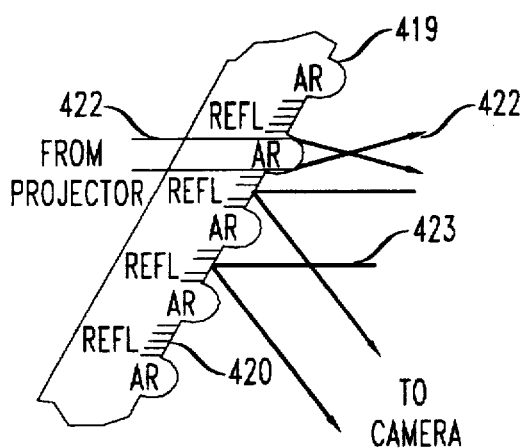
FIG. 5 is a fragmentary view of part of the projection screen of FIG. 4.

Referring to FIGS. 4 and 5, there is shown another embodiment of the invention for performing the same function as the apparatus of FIG. 1. For this reason, the components of FIGS. 4 and 5 that are analogous to components of FIG. 1 have like reference numerals in the 400 series. For example, a matrix array of microlenses 419 of FIG. 4 are analogous to lenses 19 of FIGS. 1 and 2. The microlenses 419 are preferably coated with an antireflecting material as designated by AR in FIG. 5, while the regions 420 are coated with a reflecting material designated Refl. Consequently, the rays 423 emanating from viewer 414 are reflected by regions 420 to the camera 415, As before, the display screen 412 is made of transparent material such that rays 422 from the projection system 413 are transmitted through the display screen 412 so that they can be seen by the viewer.

Figure 6:
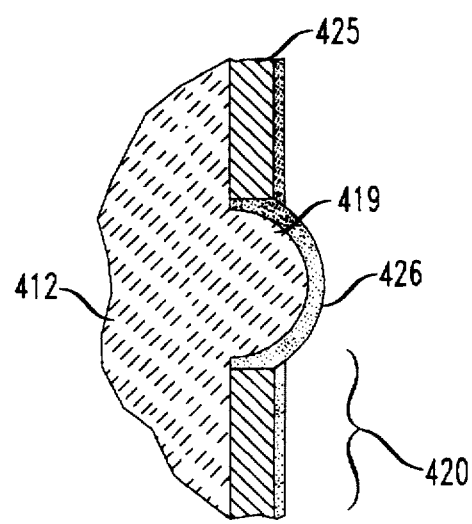
FIG. 6 is another fragmentary view of part of the projection screen of FIG. 4.

Referring to FIG. 6, the reflective portion 420 can be made by depositing on the substrate 412 a layer 425 of aluminum, which is highly reflective in the visible spectrum. As is known, aluminum bonds well to glass (silicon dioxide), which is the material from which substrate 412 would be most commonly made. Openings in the aluminum layer 425 for the lenses 419 can accurately be made by photolithographic masking and etching, as is well known. An antireflection coating 426 may be then deposited over the entire surface to provide the antireflection coating for the lenses 419. The fact that the antireflection coating overlies the aluminum 425 would normally have no bearing on the reflectivity of the layer 425. Of course, one could etch away that portion of the antireflection coating that overlies layer 425 if so desired. The antireflection coating could be a standard broad-band coating such as magnesium fluoride (MF$_2$), or it could be a suitabable multilayer of SiO$_2$ or TiO$_2$ as are known in the art. The antireflection coating can also be used over the lenses 19 of FIGS. 1–3.

Figure 7:
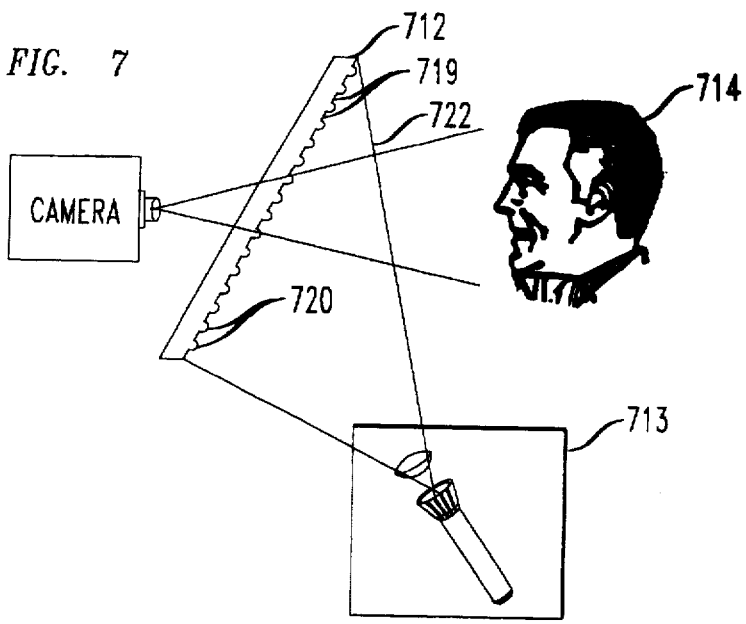
FIG. 7 is a schematic view of another embodiment of the invention.

Referring now to FIG. 7, there is shown still another embodiment in which the video projector 713 is on the same side of screen 712 as is the viewer 714. Elements 719 are convex mirrors, rather than concave transparent lenses as in the previous embodiments. Consequently, rays 722 from the video projector 713 are reflected toward the viewer 714, permitting the viewer to see the projected image. The reflected light 723 from the viewer is transmitted through transparent regions 720. As before, AR represents antireflection coating, and Refl represents reflecting surfaces. Concave lens surfaces can be made as is known in the art by using convex surfaces, for example, as molds for forming such configurations in the glass substrate. Reflective and antireflective coatings can be made as was described before. The mirrors of FIG. 7 are preferably arranged in a matrix configuration as shown in FIG. 3, and perform the same function as the lenses of FIG. 3.

Figure 8:
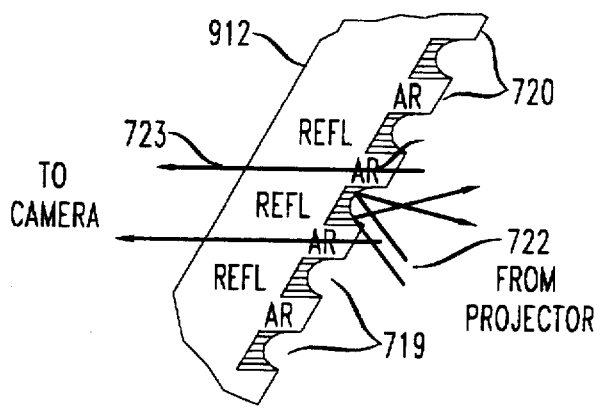
FIG. 8 is a fragmentary view of part of the screen of FIG. 7.
Figure 9:
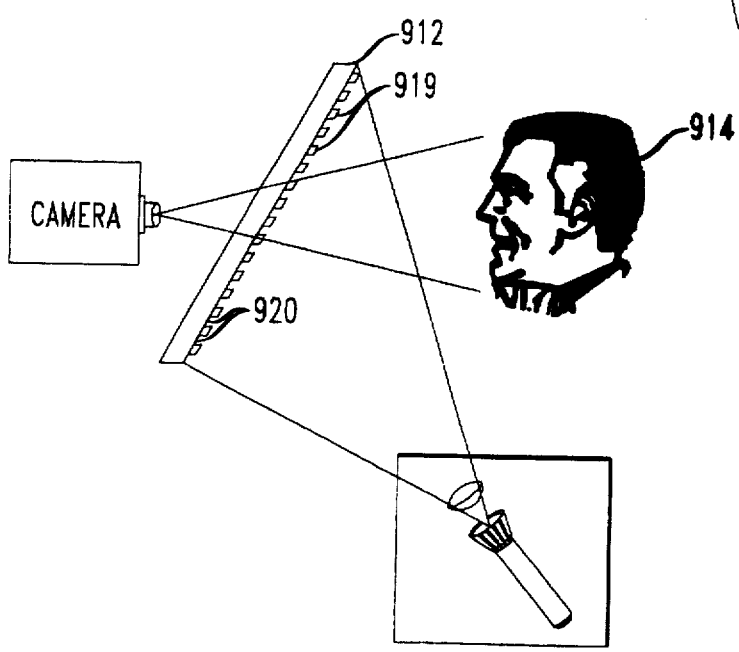
FIG. 9 is a schematic view of still another embodiment of the invention.

A cruder form of the embodiment of FIGS. 7 and 8 is shown in FIG. 9 in which the display screen 912 comprises a matrix array of planar reflective surfaces 919 separated by planar transparent surfaces 920. The reflective surfaces 919 are preferably ground or roughened and perform the same function as the mirror surfaces 719 of FIGS. 7 and 8 except that they simply scatter light and do not perform any lens function. Consequently, the image may not be reflected with as much optical efficiency to the viewer 914, as is true of the FIG. 7 embodiment. The embodiment of FIG. 9, however, has the advantage of being extremely simple to make and use, and experiments have shown that the image perceived by the viewer 914 may be satisfactory for many purposes. Of course, as with the other embodiments, the regions 919 and 920 are purposely made to be too small to be separately resolved by the eye.

All of the embodiments described above comprise a first array of first regions for directing to the viewer the video display images, and a second array of second regions interspersed among the first regions for transmitting to the video camera the viewer's image. It is assumed, for the two images to be transferred simultaneously through the single screen, that the individual first and second regions are each too small to be separately resolved by the human eye. This consideration is analyzed in more detail, for example, in the book, "Optics," E. Hecht and A. Zajac, *Addison-Wesley Publishing Company, Inc.*, Reading, Mass. et al., 1979, page 354. Generally, the smallest feature that the eye can resolve is a separation of $1/1000$ of the distance from the eye to the object. Thus, the lens or feature pitch should be no larger than $1/1000$ of the expected closest screen-to-eye distance. If this distance is taken as being one foot, three hundred five microns is the largest acceptable pitch. It is preferred, however, that the pitch or minimum feature size be less than two hundred microns. In experiments using the FIG. 9 embodiment, the diameter of regions 919 wag seventy microns, and the pitch or center-to-center distance was one hundred microns. The ratio of the area of regions 920 to that of regions 919 was about 1.63; consequently, sixty-two percent of the area was made up of regions 920, and thirty-eight percent by regions 919. Since the various projected images will depend upon such parameters as the intensity of images formed by the display device, the sensitivity of the television camera, etc., it is recommended that experiments be made prior to the design of a specific system in accordance with the invention to determine a suitable area ratio.

The various embodiments described are considered to be only illustrative of the inventive concepts involved. One could make the display screen of various materials other than glass. The use of antireflecting coatings may often be preferred as described above, but are not essential to the operation of any of the embodiments. Various other modifications and embodiments may be made by those skilled in the art without departing from the spirit and scope of the invention.

I claim:

1. A video display and image sensing system comprising: means for displaying video images that can be seen by a first viewer when the first viewer's eyes lie on a first optical path; image sensing means for generating a video signal representative of an image of the first viewer; the image sensing means being located on a second optical path that includes a part of the first optical path including the eyes of the first viewer so as to give to a second viewer viewing an image of the first viewer an illusion of eye contact; wherein the improvement is characterized in that:

the display means comprises an array of lenses defining part of the first optical path, and an array of regions defining part of the second optical path;

the array of regions are distributed among the array of lenses; and the array of regions and the array of lenses each have a length and a width of less than three hundred microns, whereby the array of regions and the array of lenses are so small as to be substantially unresolvable by the first or second viewers when viewing displayed video images.

2. The apparatus of claim 1 wherein:

the array of lenses comprises means for transmitting part of the displayed video images and for blocking part of the viewer's image;

and the array of regions comprises means for transmitting part of the viewer's image and for blocking part of the displayed video images.

3. The apparatus of claim 2 wherein:

the array of lenses and the array of regions comprise means for simultaneously transmitting the displayed video image and the viewer's image.

4. The apparatus of claim 3 wherein:

the array of lenses and the array of regions are formed in a first member;

and the display means comprises a projection lens for imaging said video images onto said first member.

5. The apparatus of claim 4 wherein:

the first member is flat and has first and second sides;

and the array of lenses is located on the first side of the first member.

6. The apparatus of claim 5 wherein:

the array of regions are substantially transparent regions;

and the image sensing means is located adjacent the second side of the first member.

7. The apparatus of claim 4 wherein:

the array of regions comprises a mirror.

8. The apparatus of claim 6 wherein:

each lens comprises a substantially transparent microlens.

9. The apparatus of claim 5 wherein:

the array of regions comprises an array of substantially reflective regions in a first side of the first member;

and the image sensing means is located adjacent a second side of the first member.

10. The apparatus of claim 1 wherein:

the image sensing means comprises a video camera;

and the display means comprises a flat screen in which the array of regions and the array of lenses are defined, and a video projection system for imaging said video images onto said flat screen.

11. The apparatus of claim 10 wherein:

the array of lenses comprises an array of microlenses that define part of the first optical path, each microlens having a substantially circular periphery with a diameter of less than three hundred microns;

and the microlenses are substantially uniformly distributed on the flat screen.

12. An eye contact video telephony system comprising:

a display screen;

means for projecting onto said display screen, video images that can be seen by a viewer;

means comprising a video camera for sensing and transmitting an image of the viewer as the viewer watches video images;

said display screen comprises an array of lenses and an array of regions, said array of regions being interspersed among the array of lenses;

the array of lenses comprising means for directing to the viewer, video images;

the array of lenses and the array of regions being too small to be individually resolvable when conventionally viewed by said viewer;

and the array of regions comprising means for transmitting to the video camera said viewer's image, simultaneously with the projection of said video images to said viewer;

said video camera being aligned with a position on the screen toward which the viewer looks to observe video images, whereby the viewer's image can be transmitted by the video camera with an illusion of eye contact.

13. The apparatus of claim 12 wherein:

the display screen directs video images from a first side thereof toward the viewer;

the array of lenses define a first optical path from the projecting means to the viewer;

the array of regions define a second optical path from the viewer to the video camera, part of the second path being displaced from the first path to allow the video camera to be displaced from the projecting means.

14. The apparatus of claim 12 further comprising:

means for forming video images;

and wherein the projecting means comprises a lens between the forming means and the display screen for projecting video images substantially onto the display screen.

15. The apparatus of claim 12 wherein:

each lens of the array of lenses has a substantially circular periphery of less than about three hundred microns in diameter.

16. The apparatus of claim 15 wherein:

the array of lenses comprise an array of elements formed on a substrate by replicating the configurations of an array of meniscus shaped plastic material.

17. The apparatus of claim 15 wherein:

each of said lenses is a transparent lens;

and the array of regions is a transparent region;

the viewer is located on one side of the display screen, and the video camera and the means for projecting onto said display screen, are located on the opposite side of the display screen.

18. The apparatus of claim 15 wherein:

each of the lenses is transparent, and the array of regions is reflective;

and the viewer and the camera are on one side of the display screen, and the means for projecting onto said display screen is located on the other side of the display screen.

19. The apparatus of claim 12 wherein:

the array of regions is a mirror;

and the array of lenses is transparent;

the viewer and the means for projecting onto said display screen are located on one side of the display screen, and the video camera is located on the opposite side of the display screen.

20. The apparatus of claim 12 wherein:

each lens of the array of lenses is a microlens which is separated from the other microlenses;

and the array of regions are interconnected.

21. A video telephony method comprising: projecting an image on a screen that can be seen by a first viewer when the first viewer's eyes are directed along a first optical path; sensing the image of the first viewer on a second optical path that includes a part of the first optical path upon which lie the first viewer's eyes; transmitting and displaying the image of the first viewer so as to give to a second viewer viewing an image of the first viewer an illusion of eye contact; wherein the improvement is characterized in that:

the screen comprises an array of lenses defining part of the first optical path, and an array of regions defining part of the second optical path;

the array of regions are distributed among the array of lenses; and the array of regions and the array of lenses each have a length and a width of less than three hundred microns, whereby the array of regions and the array of lenses are so small as to be substantially unresolvable by the first viewers when viewing displayed video images.

22. The method of claim 21 wherein:

the array of lenses transmits part of the displayed video images and blocks part of the viewer's image;

and the array of regions transmits part of the viewer's image and blocks part of the displayed video images.

23. The method of claim 22 wherein:

the array of regions and the array of lenses simultaneously transmit the displayed video image and the viewer's image.

24. The method of claim 23 wherein:

the projecting step comprises the step of forming a first display and then using a lens to image the first display on said screen.

25. The method of claim 21 wherein:

the array of lenses comprises an array of microlenses that define part of the first optical path, each microlens having a substantially circular periphery with a diameter of less than three hundred microns.

* * * * *